No. 793,947. PATENTED JULY 4, 1905.
J. H. MILLETT & F. A. HANNAH.
STEAM SAFETY VALVE.
APPLICATION FILED JUNE 29, 1904.

Witnesses:
Edwin T Luce
Waterman L. Williams

Inventors:
Joshua H. Millett
Frederick A. Hannah
by Ralph W. Foster, Attorney

No. 793,947.                                                                                                   Patented July 4, 1905.

UNITED STATES PATENT OFFICE.

JOSHUA H. MILLETT, OF MALDEN, AND FREDERICK AUGUSTUS HANNAH, OF MEDFORD, MASSACHUSETTS, ASSIGNORS TO CROSBY STEAM GAGE AND VALVE COMPANY, OF BOSTON, MASSACHUSETTS, A CORPORATION OF MASSACHUSETTS.

STEAM SAFETY-VALVE.

SPECIFICATION forming part of Letters Patent No. 793,947, dated July 4, 1905.

Application filed June 29, 1904. Serial No. 214,632.

*To all whom it may concern:*

Be it known that we, JOSHUA H. MILLETT, a resident of Malden, and FREDERICK AUGUSTUS HANNAH, a resident of Medford, in the county of Middlesex and State of Massachusetts, citizens of the United States, have invented certain new and useful Improvements in Steam Safety-Valves, of which the following is a specification.

Our invention relates to steam safety-valves; and its object is to provide a valve that will operate with the least possible friction.

The invention is illustrated by the accompanying drawings, in which—

Figure 1:
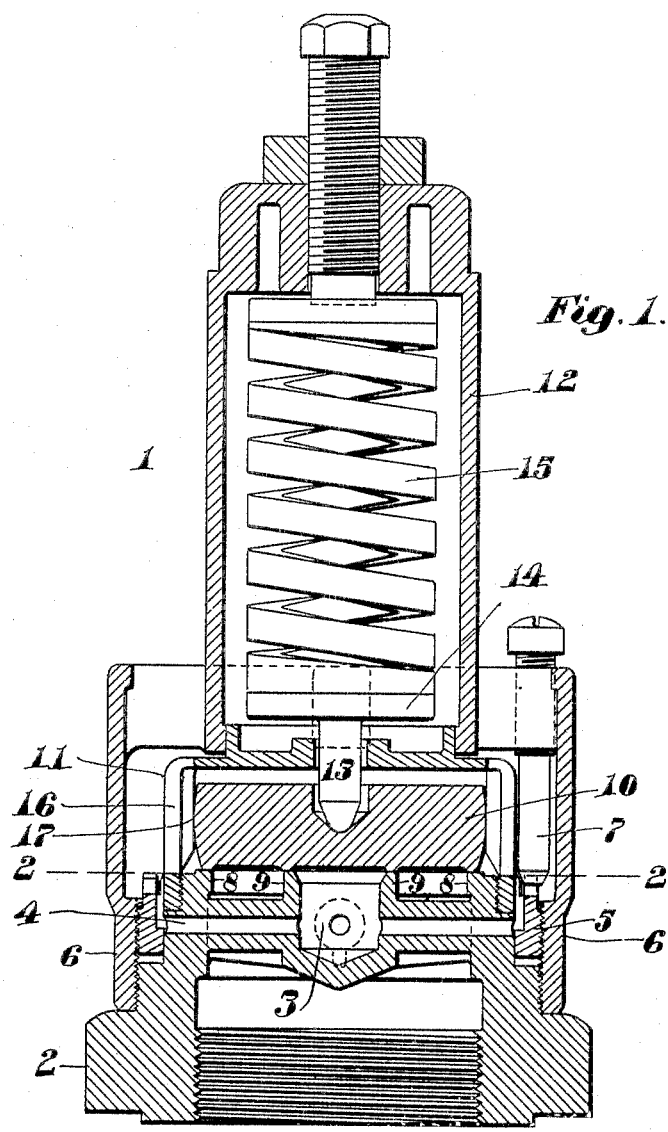
Figure 2:
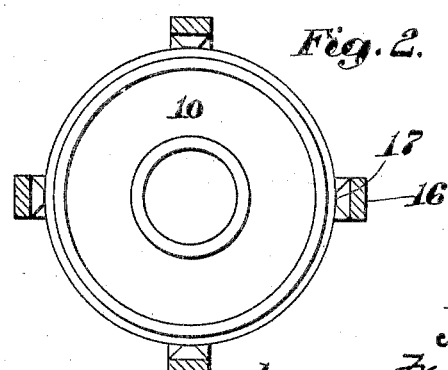

Figure 1 is a vertical central section of a valve embodying our improvement. Fig. 2 is a plan view on the line 2 2, Fig. 1.

Similar numbers refer to similar parts in the two drawings.

1 is a valve furnished with the base 2, in which is located the pop-chamber 3, with its outlets 4 controlled by the ring 5 in threaded engagement with the valve-casing 6 and locked in place by the bolt 7. In the base 2 are located also the annular valve-seats 8 and 9, on which is seated the valve proper, which we call the "disk" 10. This disk 10 is located in the cage or guideway 11, which is attached to the base 2. The top of the cage 11 forms the bottom of the spring-chamber 12, mounted on the valve-casing 6. Through the top of the cage 11 extends the pintle 13 of the spring-washer 14, the end of which pintle engages loosely the center of the disk 10. The spring 15 is mounted in the spring-chamber 12.

Disks now employed in steam safety-valves have one or more arms, wings, or projections which are in sliding contact with some part of the valve structure and serve to guide the disk as it travels from and to its seat. Any inequalities in the pressure of the spring upon the disk cause these guiding-arms of the disk to tilt and bind, thus greatly impairing the effective action of the valve. This tilting and binding arise also whenever the sliding contact of the guides is in any way disturbed. If these arms or guides are located below the disk, as is usually the case, they are constantly enveloped in steam, and the steam by its corrosive action causes them to stick, and it also abrades or furrows the valve-seat as it flows out along the line of these guides. We overcome these difficulties by employing a disk with spherical sides and without any arms, wings, or projections to serve as guides, and we locate this disk in a cage or guideway, in which it slides freely and whose vertical bars or walls serve to guide it. This cage or guideway may be made to contact with and guide the disk along such vertical lines as may be desired, or it may be a cylinder. The drawings show such a disk, which constitutes the central zone of a sphere and may be defined as the middle frustum of a sphere, for that is precisely what it is, located in a cage having four vertical guide-bars 16, each of which contacts with the disk at approximately a single point 17 and continues so to contact at only a single point however much the disk may rotate. The frustum of a sphere is any part comprised between two parallel sections, and the middle frustum of a sphere is that whose ends are equal circles. We extend the use of the term "middle frustum" to include a frustum composed of the adjoining parts of the two hemispheres, though these parts are not absolutely similar. Substantially all friction between the disk and its guiding-cage is in this way overcome or prevented. The cage 11 serves to imprison the disk and helps to prevent its escape in case of accident to the valve. It is obvious that the diameter of the sphere, of which the disk constitutes the central zone or middle frustum, must be just less than the inner diameter of the cage, and it is equally obvious that the disk must be thick enough or the cage shallow enough to always preserve the contact described by limiting the movements of the disk. In actual operation in a valve properly constructed a disk of the relative size shown in the drawings will never rotate enough to force it against the flange at the top of the guiding-cylinder.

Another feature of our invention is the guideway having a top which constitutes the bottom of the spring-chamber.

The drawings show a pop safety-valve employing a double-seated disk; but our invention is equally applicable to a single-seated disk.

What we claim, and desire to secure by Letters Patent of the United States, is—

1. In a safety-valve the combination, with the valve-casing, of a disk constituting the middle frustum of a sphere and a guideway therefor arranged within said casing, together with means for holding said disk to its seat; substantially as described.

2. In a safety-valve the combination, with the valve-casing and spring, of a disk constituting the middle frustum of a sphere and a guideway therefor arranged within said casing, said disk being held to its seat by said spring; substantially as described.

In testimony whereof we have affixed our signatures in presence of two witnesses.

JOSHUA H. MILLETT.
FREDERICK AUGUSTUS HANNAH.

Witnesses:
MARY T. HANLON,
RALPH W. FOSTER.